April 7, 1942.  B. C. SKINNER  2,278,571
METHOD OF STACKING AND TREATING FRUITS AND VEGETABLES IN COLORING ROOMS
Filed Feb. 21, 1939
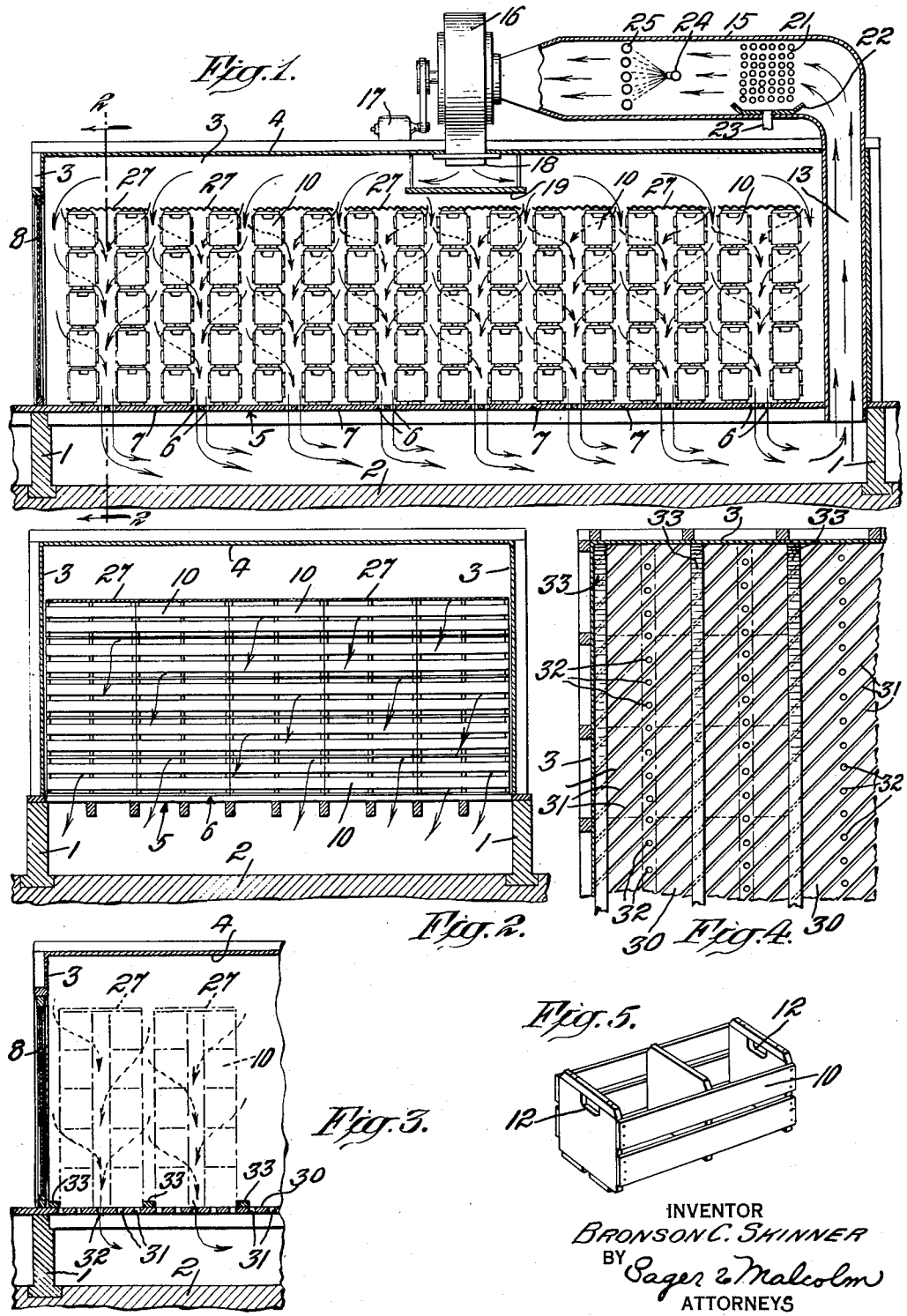
INVENTOR
BRONSON C. SKINNER
BY Sager & Malcolm
ATTORNEYS Patented Apr. 7, 1942

2,278,571

UNITED STATES PATENT OFFICE 2,278,571

METHOD OF STACKING AND TREATING FRUITS AND VEGETABLES IN COLORING ROOMS

Bronson C. Skinner, Dunedin, Fla.

Application February 21, 1939, Serial No. 257,585

7 Claims. (Cl. 99—148)

This invention relates to coloring fruits and vegetables and has for its object to provide a new and improved method of stacking and treating such produce in coloring rooms for the purpose of insuring uniform coloring of all the articles in all parts of the room.

It is a common practice to subject citrus fruits, such as oranges, grapefruit, etc., to a curing process for the purpose of improving their color preparatory to shipping the fruit to market, and the same practice is followed with bananas, tomatoes, and various other fruits and vegetables. It is well known that many fruits and vegetables, particularly citrus fruits are bought almost entirely "by the eye" and therefore growers are never able to obtain as high a price for off-color fruit as for fruit in which the color is attractively and brilliantly developed.

The usual method of curing fruits and vegetables to enhance their color is to place them in closed rooms, packed in the usual field boxes which are arranged close together and stacked one on top of another, and to subject them to the action of heated air or a reagent such as ethylene gas for a protracted period of time depending upon the nature of the fruits or vegetables being treated.

Most of the modern coloring rooms in use today in packing houses or in fruit groves are of the type employing a false floor upon which the fruit or vegetable boxes are stacked. This false floor is provided with openings, usually in the form of narrow slots between the floor planks, the planks being laid diagonally so that no slot can ever be completely obstructed by the boxes and also for the purpose of facilitating trucking across the slots. The heated gases are continuously circulated through the room and false floor in a way intended to bring the gases in contact with all the fruits or vegetables in all parts of the room.

In actual practice, however, there is a marked difference in the color developed in the fruits and vegetables according to the position which they occupy in coloring rooms of the above type. The usual practice in treating citrus fruits is to circulate the gases downwardly from the roof of the room, and through the boxes of fruit and the false floor, and in such case the fruit contained in the upper rows of boxes adjacent the roof of the room are always found to develop a deeper and fresher color than the fruit which are placed near the bottom of the stacks. I have found that this is due to the fact that the circulating gases come into more intimate contact with the fruit at the top of the stacks than with the lower tiers, and also to the fact that the gases coming in contact with the lower tiers of fruit are at least partly cooled and spent by their passage through the upper tiers. In addition to being cooled, this air in passing down through the fruit picks up moisture, so that the air surrounding the fruit in the lower part of the room has a higher relative humidity than the air in contact with the boxes in the upper part of the room, resulting in excessive wilt in the fruit in the top of the room and excessive decay in the fruit in the bottom of the room. The difference in color is sometimes so marked that the lowest tiers of fruit may show little improvement after their treatment in a coloring room of the above type.

I have discovered a novel method of stacking fruits and vegetables in coloring rooms which avoids the unequal and non-uniform treatment referred to above. In carrying out my method I employ a coloring room having a false floor containing spaced openings for the circulation of gases therethrough, and I stack the usual field boxes containing the fruits or vegetables one upon another in spaced parallel rows with two such rows of boxes disposed between each open section of the floor. The field boxes are of the usual open or slatted construction, and, due to my special method of stacking the boxes in the room, one side of each box in any given stack will face toward one of the openings in the false floor while the opposite side of each box will face toward a solid portion of the floor through which no gases can pass. In other words, the openings in the floor will lie between alternate stacks of boxes rather than between each stack of boxes.

The heated gases used to color the fruits and vegetables may be circulated through the room in any desired manner, the usual method being to circulate the gases downwardly throughout all parts of the room and in contact with the contents of the boxes, and thence downwardly through the false floor to the bottom of a stack or conduit which returns the gases to the top of the room in a continuous recirculating stream. Heretofore the gases circulating in a system of this type could reach the lower tiers of boxes only after passage through the upper tiers; but with my method of stacking, as will be evident from the following description, substantial portions of the gases circulated through the room are drawn downwardly between the alternate stacks of boxes in the spaces where no openings exist in the false floor, and the only way for such gases to flow is through the various lower tiers of boxes into the next adjacent spaces which communicate directly with the floor openings through which the gases can escape. In this way the gases circulated through the room and floor are directed through each layer of boxes in each of the rows with the result that the contents of all the boxes are subjected to substantially the same treatment and are therefore colored uniformly. It is true that the air passing through these boxes in a crosswise direction is cooled to a certain extent and picks up a certain amount of moisture, but inasmuch as the distance of travel through the box is only about 12 inches, whereas the distance of travel in the usual method of coloring from the top downward through the boxes is about 60 inches, the cooling effect and the increase in relative humidity is much less by my method than it is by the usual method in practice at the present time.

These and other features and advantages of the invention will be described in connection with the accompanying drawing, in which:

Fig. 1 is a vertical sectional view of a coloring room embodying the invention;

Fig. 2 is a transverse section taken on line 2—2 of Fig. 1;

Fig. 3 is a fragmentary sectional view similar to Fig. 1, illustrating a modification of the invention;

Fig. 4 is a fragmentary plan view of the floor employed in the coloring room of Fig. 3; and Fig. 5 is a perspective view showing the usual type of field box in which the fruits or vegetables may be packed during the coloring operation.

The coloring room shown in Figs. 1 and 2 is built upon solid walls 1 resting upon the ground or upon a suitable foundation 2, and is provided with the usual four walls 3, roof 4 and a false floor 5 which is mounted a suitable distance above the foundation 2.

In the embodiment illustrated, the openings in the false floor 5 are in the form of narrow parallel slots or cracks 6 between the floor planks, and they are shown arranged in pairs although they may be arranged singly or formed in any other desired manner as by boring parallel rows of holes in the floor planks. In any event, whether the openings 6 are arranged singly or grouped in pairs, as illustrated, the various rows of openings are separated a distance sufficient to permit two spaced parallel rows of boxes to rest between the adjacent rows of openings 6 with a solid portion 7 of the floor lying between such boxes as shown in Fig. 1.

One of the walls of the room is provided with a door 8 for the admission of boxes of fruit which are usually carted in on trucks, it being understood that a similar door may be provided in the opposite wall or elsewhere if desired. The usual practice is to cart the boxes of fruit in from the fields through one door and cart them out through another door at the opposite end of the room leading into the packing plant at the conclusion of the coloring operation. Any suitable type of open or slatted box may be used to hold the fruits or vegetables during the coloring operation. Fig. 5 shows the usual type of slatted field box 10 which is 33" long, 15" high and 13" wide, and is provided with handles 12 at the ends for carrying purposes.

In the embodiment shown in Fig. 1 a pipe or conduit 13 extends upwardly through the floor 5 and through the roof of the room where it leads into a horizontal extension or passage 15 which is connected to the inlet side of a fan or blower 16 driven by a motor 17. The outlet 18 of the blower opens into the center of the room directly above a horizontal baffle plate 19 which deflects the incoming stream of gases downwardly to all parts of the room. In this way the fan causes a continuous recirculation of gases which pass downwardly throughout all parts of the room, and thence downwardly through the slotted floor 5 to the bottom of the conduit 13 into passage 15, as indicated by the arrows in Fig. 1. The passage 15 is provided with suitable cooling coils 21 beneath which is a drip pan 22 and drain pipe 23 for conducting condensed moisture out of the circulating stream of gases. The passage 15 also contains a steam jet 24, which may also be used for admitting ethylene gas or the like into the circulating system, and with a suitable dry heater or radiator 25 which in the form shown is mounted adjacent the inlet side of the fan 16.

In arranging the boxes 10 of fruits or vegetables in the coloring room I stack the boxes in spaced parallel rows extending transversely of the room, with two such rows of boxes disposed between each row of openings 6 in the floor 5, so that one side of each box will face towards a slot or opening 6 in the floor while the opposite side of the box will face toward a solid portion 7 of the floor as shown in Fig. 1 of the drawing. The boxes in each row are preferably stacked closely end to end to insure passage of the gases directly through the boxes for maximum efficiency. All the rows of boxes are preferably, though not necessarily, stacked to the same height in order to utilize the maximum capacity of the room, and as the stacking operation progresses I place shields 27 of corrugated iron or any other suitable material over the tops of adjacent rows of boxes so as to cover only the spaces between the boxes which communicate directly with the openings 6 in the floor. The purpose of these shields 27 is to prevent the heated gases from following a short circuit directly down through the spaces between the boxes which lie directly over the openings 6, from which it will be seen that the gases can reach the openings 6 only after passing through the boxes 10 in intimate contact with the fruits or vegetables under treatment.

In the operation of the particular coloring room shown in Fig. 1, the room is first filled with the boxes of fruit or vegetables stacked in the manner described above, after which the doors of the room are closed. The blower 16 is set in operation and live steam is introduced into the room through jet 24 for a period of time sufficient to raise the temperature of the fruit or vegetables at least to the wet bulb temperature at which the room is to operate, three to six hours usually being sufficient for this purpose according to the size of the room. For example, if the room is to be operated at a temperature of 85° F., with 80% humidity, the wet bulb temperature would be 80° F., so steam would be introduced into the room for a period of three to six hours and the room maintained with the live steam at a temperature of 80° F. At the end of this period when the fruit or vegetables have reached the temperature of the room, the steam is cut off and the radiator or heating coils 25 turned on and the dry bulb temperature of the room raised to 85° F., the blower 16 maintaining the circulation of the heated steam as indicated by the arrows in Fig. 1.

At this point the fruit or vegetables will begin to give off moisture, and the wet bulb temperature of the room will rapidly rise to a point close to the dry bulb temperature. At such time, or sooner, the operator starts the cooling coils 21 in operation, causing the excess moisture to be condensed on the coils 21 and drip into the pan 22 from which it is continuously removed from the circulating system through pipe 23. Ethylene or any other suitable gas may be admitted to the room through a suitable pipe to assist in the coloring operation, or the coloring may be influenced entirely by the gases given off by the fruits or vegetables themselves. The room is kept substantially closed during the entire coloring operation, except for intermittent periods of inspection to see how the coloring is progressing, and the humidity is maintained at the desired point throughout the coloring operation by removing the proper amount of moisture. This particular circulating system for controlling the humidity of the room during the coloring operation is disclosed and claimed in my copending application Serial No. 255,930, filed February 11, 1939, and is shown herein merely for purposes of illustration, it being understood that my improved method of stacking the boxes of fruits and vegetables may be used with other types of coloring rooms.

The fan 16 causes a continuous recirculation of the heated gases which are spread out over the top of the room by the baffle plate 19 as described above. These gases, being prevented by the shields 27 from passing directly down through the spaces between the boxes which communicate directly with the openings 6 in the floor, are naturally first drawn down into the various alternate spaces between the boxes which are above the solid portions 7 of the floor 5 and are therefore not vented directly to the space between the floor. The suction through the openings 6 therefore causes the gases to be drawn with substantial uniformity through all the boxes in each tier before passing downwardly through the floor as indicated by the arrows in Figs. 1 and 2. In this way the gases pass in intimate contact with the surfaces of the entire charge of fruit or vegetables, the lower tiers being subjected to the same action as the upper tiers so that the contents of all the boxes are colored uniformly.

Figs. 3 and 4 illustrate the invention as applied to a coloring room which is similar to that described above except that the false floor is constructed of planks 30 which are laid diagonally and spaced apart to provide slots or openings 31 between the various planks. At intervals in the floor corresponding to alternate spaces between the rows of field boxes rows of holes 32 are bored, these holes 32 corresponding to the openings 6 in Fig. 1 and being for the purpose of circulating the gases through the floor between alternate rows of boxes. Between the various rows of holes 32, at a distance corresponding to the spaces between every other row of field boxes, I lay strips 33 of wood, metal or other suitable material for the purpose of obstructing the slots 31 between the planks 30, these strips 33 corresponding to the solid portions 7 of the floor between the alternate rows of boxes in Fig. 1.

In the form of the invention shown in Figs. 3 and 4 the coloring gases pass through the holes 32 in the floor between alternate rows of boxes, and also through the unobstructed slots 31 which lie directly below the various boxes, but these gases are prevented from passing through the floor in the alternate spaces between the boxes where the floor planks are covered by the strips 33. The path of the gases is substantially the same as described above in connection with Figs. 1 and 2, the advantage of the construction in Figs. 3 and 4 being that it provides a simple and inexpensive method and means for applying the invention to existing types of coloring rooms which are already provided with false floors of this diagonally slotted type.

The invention claimed is:

1. Method of stacking open boxes of fruits and vegetables in a coloring room having a false floor containing spaced openings for the circulation of gases therethrough, which comprises stacking said boxes in spaced rows with two such rows of boxes disposed between each of the openings in said floor, whereby gases circulated through said room and floor are directed through each of said boxes to color the contents of each box uniformly.

2. Method of stacking open boxes of fruits and vegetables in a coloring room having a false floor containing spaced parallel openings for the circulation of gases therethrough, which comprises stacking said boxes in spaced parallel rows with two such rows of boxes disposed between each of the parallel openings in said floor, whereby gases circulated through said room and floor are directed through each of said boxes to color the contents of each box uniformly.

3. Method of stacking open boxes of fruits and vegetables in a coloring room having a false floor containing spaced parallel openings for the circulation of gases therethrough, which comprises stacking said boxes in spaced parallel rows with two such rows of boxes disposed between each of the parallel openings in said floor, and covering the tops of those alternate spaces between the boxes which communicate with said floor openings, whereby gases circulated through said room and floor are directed through each of said boxes to color the contents of each box uniformly.

4. Method of stacking and treating fruits and vegetables in a coloring room having a false floor containing spaced parallel openings for the circulation of gases therethrough, which comprises stacking open boxes of such produce one on another in spaced parallel rows with two such rows of boxes disposed between each of the parallel openings in said floor, and circulating gases through said room and floor and directly through each of said boxes to color the contents of each box uniformly.

5. Method of stacking and treating fruits and vegetables in a coloring room having a false floor containing spaced parallel openings for the circulation of gases therethrough, which comprises stacking open boxes of such produce one on another in spaced parallel rows with the ends of the adjacent boxes in each row close together and with two such parallel rows of boxes disposed between each of the parallel openings in said floor, and circulating gases through said room and floor and directly through each of said boxes to color the contents of each box uniformly.

6. Method of stacking and treating fruits and vegetables in a coloring room having a false floor containing spaced parallel openings for the circulation of gases therethrough, which comprises stacking open boxes of such produce one on another in spaced parallel rows with two such rows of boxes disposed between each of the parallel openings in said floor, covering the tops of those alternate spaces between the boxes which communicate with said floor openings, and circulating gases downwardly through said room and floor and directly through each of said boxes to color the contents of each box uniformly.

7. Method of stacking and treating fruits and vegetables in a coloring room having a false floor containing spaced parallel openings for the circulation of gases therethrough, which comprises stacking open boxes of such produce one on another in spaced parallel rows with the ends of the adjacent boxes in each row close together and with two such parallel rows of boxes disposed between each of the parallel openings in said floor, placing shields over the tops of alternate rows of boxes to cover such spaces between the boxes as communicate directly with said floor openings, and circulating gases downwardly through said room and floor and directly through each of said boxes to color the contents of each box uniformly.

BRONSON C. SKINNER.